(No Model.)

W. T. JACKSON.
PIPE JOINT.

No. 317,794. Patented May 12, 1885.

WITNESSES:
Darwin S. Wolcott
C. M. Clarke

INVENTOR.
William T. Jackson
BY George H. Christy
ATTORNEY.

N. PETERS. Photo-Lithographer, Washington, D. C.

UNITED STATES PATENT OFFICE.

WILLIAM T. JACKSON, OF PITTSBURG, PENNSYLVANIA.

PIPE-JOINT.

SPECIFICATION forming part of Letters Patent No. 317,794, dated May 12, 1885.

Application filed February 11, 1885. (No model.)

*To all whom it may concern:*

Be it known that I, WILLIAM T. JACKSON, a citizen of the United States, residing at Pittsburg, in the county of Allegheny and State of Pennsylvania, have invented or discovered certain new and useful Improvements in Pipe-Joints, of which improvements the following is a specification.

Figure 1:
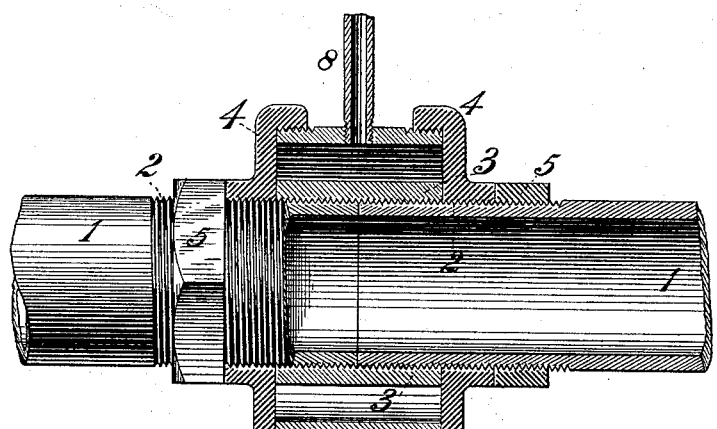
Figure 2:
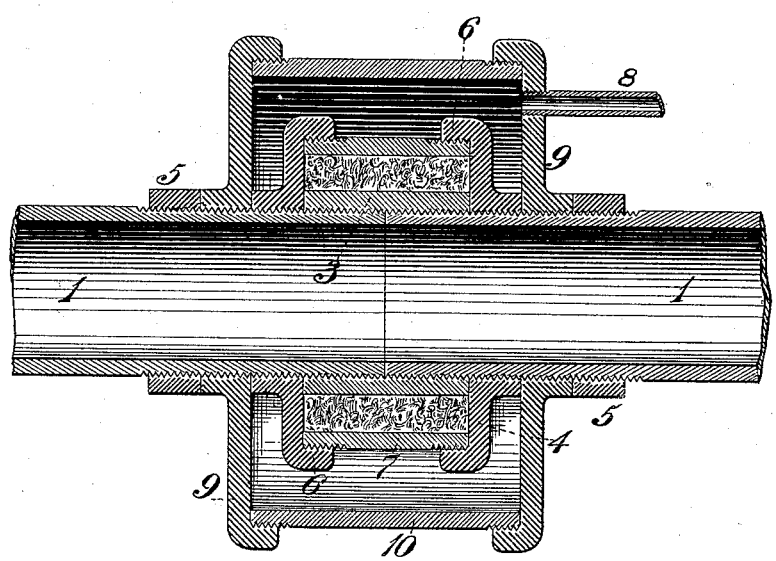

In the accompanying drawings, which make part of this specification, Figure 1 is a longitudinal section of a portion of pipe-line, showing my improved form of joint. Fig. 2 is a similar view of a modified form of the joint.

My invention relates to an improved form of joint employed in uniting sections of pipe in a pipe-line for conveying fluids under pressure; and the object of my invention is to provide a chamber or receptacle around each joint for the purpose of catching any fluid that may escape from the pipe-line at the point of union between two sections composing such line, and to conduct such leakage to a point of safety; and a further object of my invention is to strengthen the joints of the pipe-line as against longitudinal strains; and to these ends my invention consists in the construction and combination of parts, all as more fully hereinafter described and claimed. The ends of the pipe-sections 1 are threaded for a considerable distance, as shown at 2, and are united by an interiorly-threaded sleeve, 3, in the usual manner, as shown; but prior to screwing the ends of the pipes into the sleeve or coupling 3, jam-nuts 5 and disks 4 are screwed onto the pipes sufficiently far to prevent their interference with the sleeve 3 when the coupling is made. These disks 4 are formed with a threaded central opening for the reception of the pipe-sections, and with a peripheral flange, 6, threaded on its inner surface, as shown, the inner diameter of said flange being somewhat in excess of the diameter of the sleeve. Into the annular flange 6 on one of the disks 4 is screwed a section of pipe, 7, having a diameter somewhat in excess of the diameter of the sleeve 3, and a length equal to the length of said sleeve. After the ends of the sections 1 have been screwed into the sleeve or coupling 3, as above stated, the disks or end pieces 4 are screwed up until they abut against the ends of said sleeve, as clearly shown, and act as jam-nuts thereto. As the disks are being screwed toward the sleeve the free end of the pipe-section 7, which has been previously attached to one of the disks, is screwed into the annular flange 6 on the other disk, thus forming, when the disks bear against the ends of the sleeve, a tight box or chamber around the joint of the pipe sections 1, and as the parts of said box are secured together, and to the pipe-sections 1, the joint is greatly strengthened as against longitudinal strains.

To prevent any displacement of the disks 4, the jam-nuts 5, which have been placed upon the pipe-sections 1 previous to forming the joint, are screwed up against the disks 4, or against a rubber washer or other suitable packing interposed between the disks and jam-nuts 5. Into the box or chamber thus formed around the pipe-joint is inserted a vent-pipe, 8, said pipe extending a safe distance above the surface of the ground, and serving to conduct away any gas that may escape from the joint proper formed by the sleeve 3; or, if desired, a series of two or more boxes or chambers may be connected together by a small pipe laid parallel to the main pipe-line, and provided with a common vent-pipe.

As natural gas is inodorous, it may be desirable in laying pipe-lines for the conveyance of such gas to provide for odorizing the leakage, thereby providing for the ready detection of such leakage. In such a case I form a secondary chamber around the joint, as shown in Fig. 2, said chamber being formed by disks 9, and a section of pipe, 10, similar in all respects, except size, to the corresponding parts above described, and arranged outside the inner or primary chamber. In using this double joint the outer chamber is connected to the vent-pipe, and in the inner chamber is placed some gas-odorizing substance—as for example, musk or other pungent odoriferous substance. As the joints of the inner chamber are made as tight as possible, any gas which may escape through the joint proper will be retained for some time within the inner chamber, and will consequently take up some of the odorizing substance before it escapes into the outer chamber, and thence to the vent-pipe and the outer air, where its presence can be readily detected.

The section of pipe may be made of sufficient diameter to fit outside of the disks, in which case the flange 6 may be omitted, the edges of disks being threaded; or, in case two chambers are used two concentric flanges may be formed on the outer disk, the inner flange being used for supporting the section 7 of the inner chamber, and the outer flange for the section 10.

I am aware that it is not new to inclose the joints of pipe-lines in a vented box or case, as shown in Patent No. 312,470, granted February 17, 1885, to Hoeveler and McTighe, and therefore do not claim such arrangement, broadly.

I claim herein as my invention—

1. In a pipe-joint protector, the combination of disks 4, adapted to fit upon the pipe-sections outside the joint proper, and provided with inwardly-projecting annular flanges, and a section of pipe having a greater diameter than the joint proper, and constructed to fit the annular flanges on the disks, and a vent-pipe, substantially as set forth.

2. In a pipe-joint protector, the combination of an inner tight box or shell surrounding the joint, and adapted to contain an odorizing substance, and an outer box or shell surrounding the inner shell and joint, and provided with a vent-pipe, substantially as set forth.

In testimony whereof I have hereunto set my hand.

WILLIAM T. JACKSON.

Witnesses:
DARWIN S. WOLCOTT.
R. H. WHITTLESEY.